Sept. 26, 1961

J. W. LOVELY 3,001,335

APPARATUS FOR MAKING A DUAL DIAMETER
RING GAGE OR THE LIKE

Original Filed Feb. 13, 1957

INVENTOR
John W. Lovely

BY Sughrue and Rothwell

ATTORNEYS

Sept. 26, 1961 J. W. LOVELY 3,001,335
APPARATUS FOR MAKING A DUAL DIAMETER
RING GAGE OR THE LIKE
Original Filed Feb. 13, 1957 2 Sheets-Sheet 2

INVENTOR
John W. Lovely

BY Sughrue and Rothwell

ATTORNEYS

United States Patent Office 3,001,335
Patented Sept. 26, 1961

3,001,335
APPARATUS FOR MAKING A DUAL DIAMETER RING GAGE OR THE LIKE
John W. Lovely, Springfield, Vt., assignor to Bryant Chucking Grinder Company, Springfield, Vt., a corporation of Vermont
Original application Feb. 13, 1957, Ser. No. 639,902, now Patent No. 2,925,659, dated Feb. 23, 1960. Divided and this application June 2, 1959, Ser. No. 818,245
7 Claims. (Cl. 51—101)

This invention relates to an apparatus for making a dual diameter ring gage or the like.

This application is a division of my application Serial No. 639,902, filed February 13, 1957, now Patent No. 2,925,659, dated February 23, 1960.

A ring gage is a measuring instrument that generally consists of an accurately dimensioned annulus or ring. In present manufacturing and machine shop practice ring gages are commonly used in pairs to control dimensions, one of the pair being used to physically represent the minimum tolerance limit, and the other the maximum. A particularly important field of use of ring gages is as masters for setting, checking, and rechecking the indicator means in an air gaging system. These systems, well known in the art, utilize a sensing element in the form of a gage plug having radial escape orifices or nozzles for a fluid medium such as air which is supplied at a constant pressure to the interior of the plug. The outside diameter of the plug is less than the diameter of the hole to be measured, and the difference between the plug and hole diameters is the variable factor of the fluid escape area, reflected as a pressure or flow variation proportional to measured diameter. The air gage indicator means must be calibrated by the use of accurate master ring gages, and it is common practice to utilize two ring gage masters to obtain the correct indication of the maximum and minimum limit control dimensions. This involves high initial cost, costly maintenance, and elaborate and time consuming handling in use. With a dual diameter master gage ring as disclosed in my parent case, Serial No. 639,902, filed February 13, 1957, now Patent No. 2,925,659, granted February 23, 1960, substituted for the two conventional masters the initial cost is brought down and the time consumed for setting, checking and rechecking the air gage system is only a fraction of that which was needed previously.

Because of the dual diameters of the master ring gage disclosed in my parent application identified above, such ring gage cannot be ground by conventional grinding which is used to produce a single diameter ring gage or any other type of constant diameter circular workpiece. It is therefore necessary to provide a special apparatus for generating a workpiece such as a dual diameter ring gage having two separate diameters therein. It is the object of this invention to provide an apparatus for manufacting dual diameter ring gages or the like by means of a grinding operation.

Other objects and advantages will be apparent from the following description taken in connection with the accompanying drawings, wherein.

Figure 1:
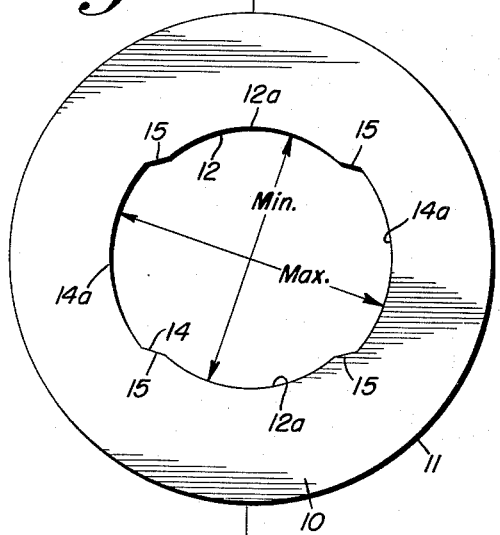
FIGURE 1 is a plan view of a ring gage illustrating the configuration of the dual diameter hole in a ring of the present invention.

Referring to FIGURE 1, the body of the gage consists of an annular gage ring body member 10 having an outside circular periphery 11, and a hole or cavity of a configuration distinctive of the present invention. Instead of having a single diameter hole as a conventional gage ring, the hole or cavity in ring body member 10 has a minimum diameter 12 and a maximum diameter 14. The difference between diameters 12 and 14 is shown grossly exaggerated for the sake of clarity. Diameters 12 and 14 each consist of two pair of arcuate sections 12a and 14a on the inner periphery of the ring. The matching sections of the same arcuate radius are positioned in opposite quadrants, and each section is connected to the adjoining section at a smooth transition zone or step 15.

Figure 2:
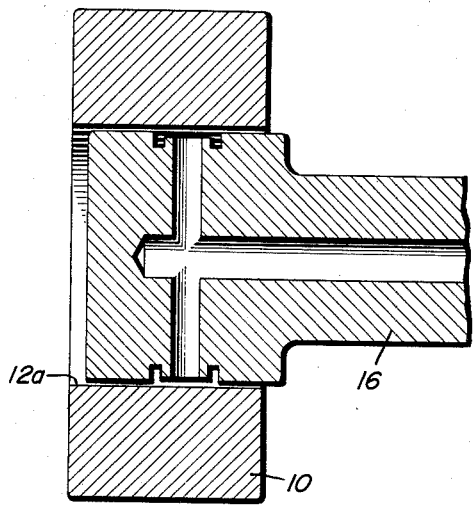
FIGURE 2 is a sectional elevation view taken on line 2—2 through the minimum hole diameter of FIGURE 1 and also showing a typical air gage in section.
Figure 6:
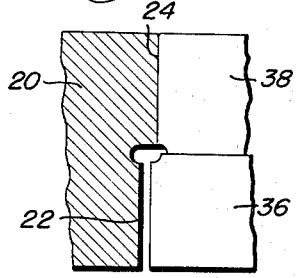
FIGURE 6 is a fragmental view illustrating a different arrangement of the fixture support.
Figure 8:
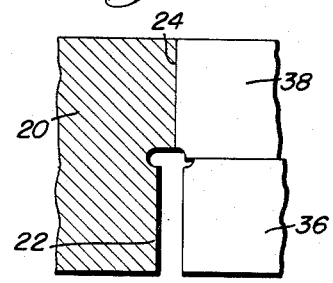
FIGURE 8 is a variation of the arrangement in FIGURE 6.

In FIGURE 2, a conventional air gage plug 16 is introduced with its lateral nozzles directed to measure the minimum diameter 12. The air gage plug is a device well known in the art and forms no part of the invention. It will be apparent that when the plug 16 is introduced into the gage ring as in FIGURE 2, it may be rotated 90° with respect to the gage, thus permitting an operator to check the plug past and repeatedly for both the minimum and maximum tolerance limits.

Figure 3:
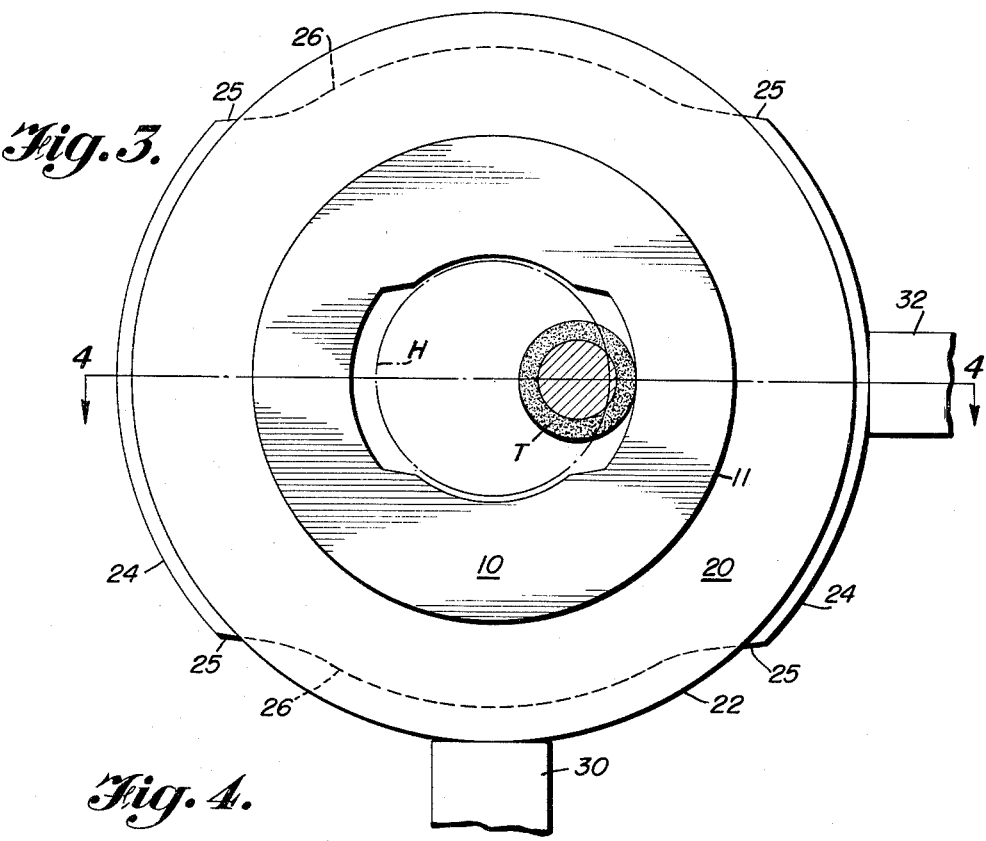
FIGURE 3 is a plan view of a fixture for machining the hole in a gage ring of the invention.
Figure 4:
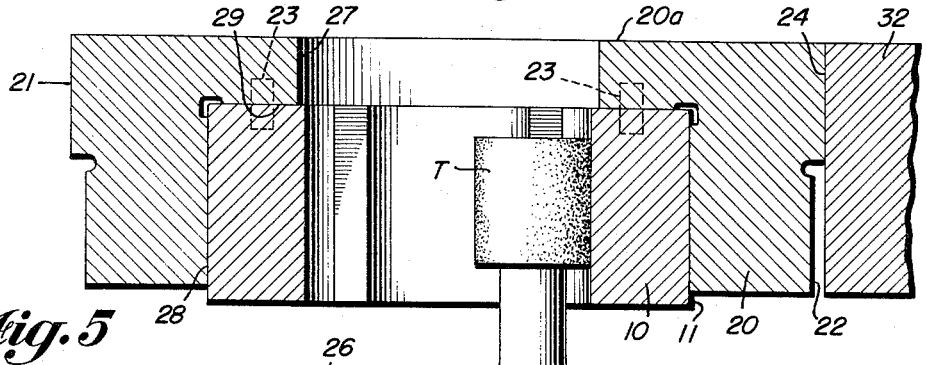
FIGURE 4 is a sectional view taken on line 4—4 of FIGURE 3.

The apparatus for generating the dual diameter hole and the method of producing the same are shown in FIGURES 3 to 9. In general the apparatus includes a cam-fixture and workholder 20 adapted to be used in conjunction with a grinder such as disclosed in my copending application Serial No. 621,862, filed November 13, 1956, now Patent No. 2,836,936. The body of fixture 20 has a face portion 20a to be placed in frictional relationship with the face of a driver spindle and rotated thereby in a manner described in the application referred to above. The body has a central bore 27 with an enlarged portion 28 of a diameter in which the outside perimeter 11 of gage ring 10 is snugly fitted, while a bottom face 29 axially supports the gage ring. Dowels 23 or any other suitable means may be used to prevent relative rotational movement between the fixture and gage ring. On the outside perimeter of the fixture are two concentric surfaces 21 and 22 one above the other. Surface 22 is formed as a cylinder and is radially supported by a fixed shoe 30 establishing the vertical position of the fixture as viewed in FIGURE 3. Surface 21 is a cam and has two diametrically opposed arcuate effective cam portions 24 of a diameter larger than that of cylindrical surface 22; this difference in diameters is equal to the desired tolerance spread of the gage ring to be manufactured. Between the arcuate portions 24, which each cover are slightly less than a quadrant, are two diametrically opposed ineffectual clearance portions 26 having a dimension less than the diameter of cylindrical surface 22. Where portions 24 and 26 are joined steps 25 are formed. Peripherally removed 90° from shoe 30 is another fixed shoe 32 adjacent the edge of fixture 20 and this shoe 32 has a width at least equal to the width of the fixture, as shown in FIGURE 4.

Figure 5:
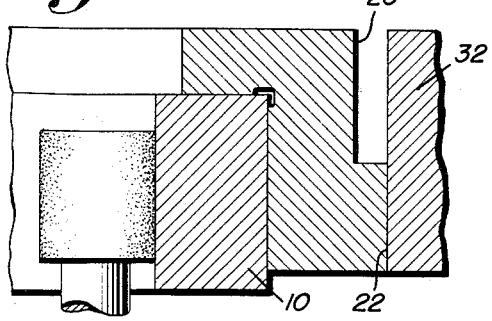
FIGURE 5 is a partial sectional view similar to FIGURE 4 after the fixture has been rotated clockwise 90°.

In operation, when the fixture 20 is compelled to rotate, while held against the shoes 30 and 32, cylindrical surface 22 which is in continuous contact with shoe 30 will establish a fixed vertical position of the system. Shoe 32 on the other hand will alternately contact and support the fixture at surfaces 24 and 22. In FIGURE 4 where the elements have the same relative position as in FIGURE 3 shoe 32 is contacting cam 24. In FIGURE 5, the fixture 20 has turned approximately 90° from the position in FIGURES 3 and 4 and now the shoe 32 is contacting cylinder 22. This interaction between the fixture and shoe 32 will impart a desired oscillatory motion along a horizontal line through the center of the fixture and its point of contact on the perimeter with shoe 32. A tool T has its direction of feed along this horizontal line. A workpiece, having a rough hole H, is attached to the fixture and the tool T is introduced as indicated and fed in the direction towards shoe 32 while the fixture is rotated with the effect that a dual diameter hole of a configuration as described in conjunction with FIGURE 1 will be generated.

The above described arrangement of a single solid shoe 32 straddling the fixture and contacting surfaces 22 and 24 will impose certain limitations on the utilization of the fixture, partly because the difference in the diameters to be generated will be fixed by the initial difference between the diameters of cam surfaces 22 and 24, and partly because of absence of means other than reworking the cam surfaces to compensate for uneven wear. To overcome such shortcomings and as a refinement of the invention, FIGURES 6, 7, 8 and 9 show a preferred embodiment in which the solid shoe 32 is replaced by two independently adjustable shoes 36 and 38, the former intended to contact cylinder 22 only, and the latter to contact cam 24 only. If the supporting faces of shoes 36 and 38 are adjusted to form a single plane abutment, the resulting difference in diameters of the arcs generated would be the same as when using solid shoe 32. If now shoe 36 is moved to the left or ahead of shoe 38 as in FIGURES 6 and 7, the difference between the diameters of the arcs generated would be less than the difference between the diameters of surfaces 22 and 24. If, on the other hand, shoe 36 is moved to the right or behind shoe 38 as in FIGURES 8 and 9, the effect would be opposite or the difference between the diameters of the arcs generated would be more than the difference between the diameters of said cams. By this dual shoe arrangment, versatility of the cam fixture is favorably increased. In utilizing the preferred embodiment, only one fixture is needed for one size standard gage ring blank and by adjusting the shoes in described manner not only can the wear of the elements be compensated, but this fixture can be used for any hole diameter in the range of the standard blank and for any required tolerance spread.

Figure 10:
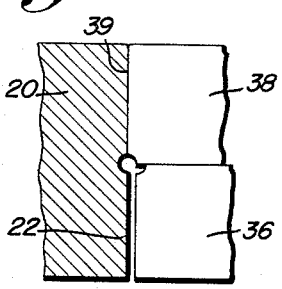
FIGURE 10 is a fragmental view illustrating the fixture support as in FIGURE 8 in cooperation with differently arranged cams.
Figure 7:
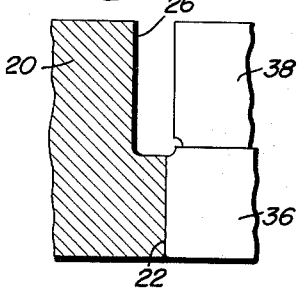
FIGURE 7 is similar to FIGURE 6 after the fixture has been rotated 90°.
Figure 9:
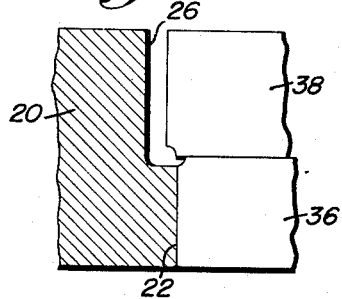
FIGURE 9 is similar to FIGURE 7 after the fixture has been rotated 90°.
Figure 11:
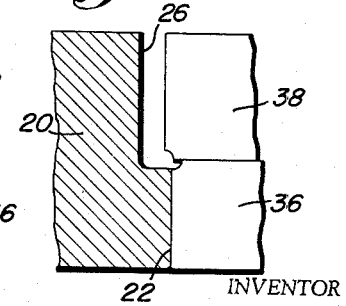
FIGURE 11 is similar to FIGURE 10 after the fixture has been rotated 90°.

FIGURE 10 illustrates a variation of the preferred embodiment where the fixture 20 in regards to the configuration of its perimeter differs from that described in conjunction with FIGURES 3, 4, and 5. In this alternate embodiment the cylindrical surface 22 continuously cooperates with shoe 30 and intermittently with shoe 36. The effective arcuate portions 39 which intermittently cooperate with shoe 38, are of equal diameter of cylinder 22 and concentric thereto. Otherwise their peripheral disposition are as previously described for portions 24, and they are in like manner joined by portions 26 of a dimension lesser than cylinder 22, and consequently less than portions 39, as indicated in FIGURE 11.

The embodiments shown and described are only illustrative. Various other embodiments will be apparent to one skilled in the art and may be utilized without departing from the scope of the appended claims.

I claim:

1. An apparatus for generating a dual diameter hole in a ring gage or the like comprising: a rotatable work holder fixture for fixedly holding said gage, said fixture having its outer perimeter divided on a plane perpendicular to the fixture axis into first and second concentric surfaces, said first surface being a cylinder, said second surface being a cam having effective perimeter portions of larger diameter than that of the cylinder disposed in two diametrically opposite quadrants, said effective portions connected by ineffectual portions relieved to a dimension below and lesser than that of the cylinder; a first fixed shoe radially supporting the fixture in frictional relationship to said cylinder only; and a second shoe spaced peripherally 90° from said first shoe and extending across both said first and second surfaces to radially support the fixture in frictional relationship alternately with the first and second surfaces, and a grinding tool adapted to be positioned in working relationship to the dual diameter hole to be generated.

2. An apparatus for generating a dual diameter hole in a ring gage or the like, comprising: a rotatable cam fixture holder for said gage; first and second concentric surfaces formed on the perimeter of the fixture, and arranged side by side, said first surface formed as a cylinder, said second surface formed by a pair of arcuate portions contained in diametrically opposite quadrants, said separated arcuate portions connected by a relieved portion at a dimension lesser than the diameter of said cylinder; a first fixed shoe that radially supports the fixture at a point on the perimeter of said cylindrical surface only and in frictional relationship thereto; a second shoe extending across both said first and second surfaces to alternately radially support the fixture on said cylinder and said larger diameter sectors, and a grinding tool in working relationship to the hole being generated, said tool being arranged for a feed movement in a direction toward said second shoe support, along the line parallel to the tangent of the point of contact of the cylinder with said first shoe.

3. A device per claim 2 where said second shoe is divided and each portion is adjustable relative each other in a radial direction, whereby the difference in the diameters of the hole to be generated may be adjusted by adjusting the portions of said second shoe.

4. An apparatus for generating a dual diameter hole in a ring gage comprising: a rotatable cam fixture holder for said ring gage, said fixture supported radially on its perimeter by first, second and third shoes; first and second concentric surfaces formed on said perimeter, and arranged side by side, said first surface being a cylinder, said second surface being made up of two pairs of portions, each pair contained in diametrically opposite quadrants, one pair of said portions being arcs constituting an effective cam surface with a diameter equal to said cylinder, and the other pair of portions being of an ineffectual, lesser dimension; said first shoe arranged to continuously support said first surface in a frictional relationship thereto, said second shoe arranged to intermittently support in like manner the said first surface at a point of its periphery 90° removed from said first shoe, said third shoe to intermittently support in like manner the said second surface on said effective arcs thereof at the same peripheral position as said second shoe, and a grinding tool adapted to be placed in working relationship with said gage, said tool being arranged for a feed movement in a direction towards said second shoe support.

5. An apparatus as defined in claim 4 wherein said second and third shoes are adjustable relative each other in radial directions toward and away from the center of said holder.

6. An apparatus as defined in claim 5 wherein said cam fixture is held continuously against said first shoe and during progressive rotation is held alternately against said second and third shoe respectively.

7. An apparatus for generating a dual diameter ring gage or the like, said apparatus comprising; a rotatable work holder adapted to hold a workpiece in fixed relationship thereto, a grinding tool in working relationship to said workpiece, said rotatable work holder having two axially spaced peripheral surfaces, one surface being cylindrical, the other surface formed as a cam, rotative axis determining support shoes adapted to cooperate with each of said peripheral surfaces, one of said support shoes cooperating with said cylindrical surface on a line perpendicular to a line of feed of said grinding tool, the other shoe being divided into split sections and adapted to cooperate with the work holder substantially in line with a line of feed of said grinding tool, the split sections of said other shoe being positioned adjacent to the cylindrical and cam surfaces for cooperating therewith and being radially adjustable with respect to each other to vary the support determined axis of rotation.

References Cited in the file of this patent

UNITED STATES PATENTS 2,836,936    Lovely _____ June 3, 1958